UNITED STATES PATENT OFFICE.

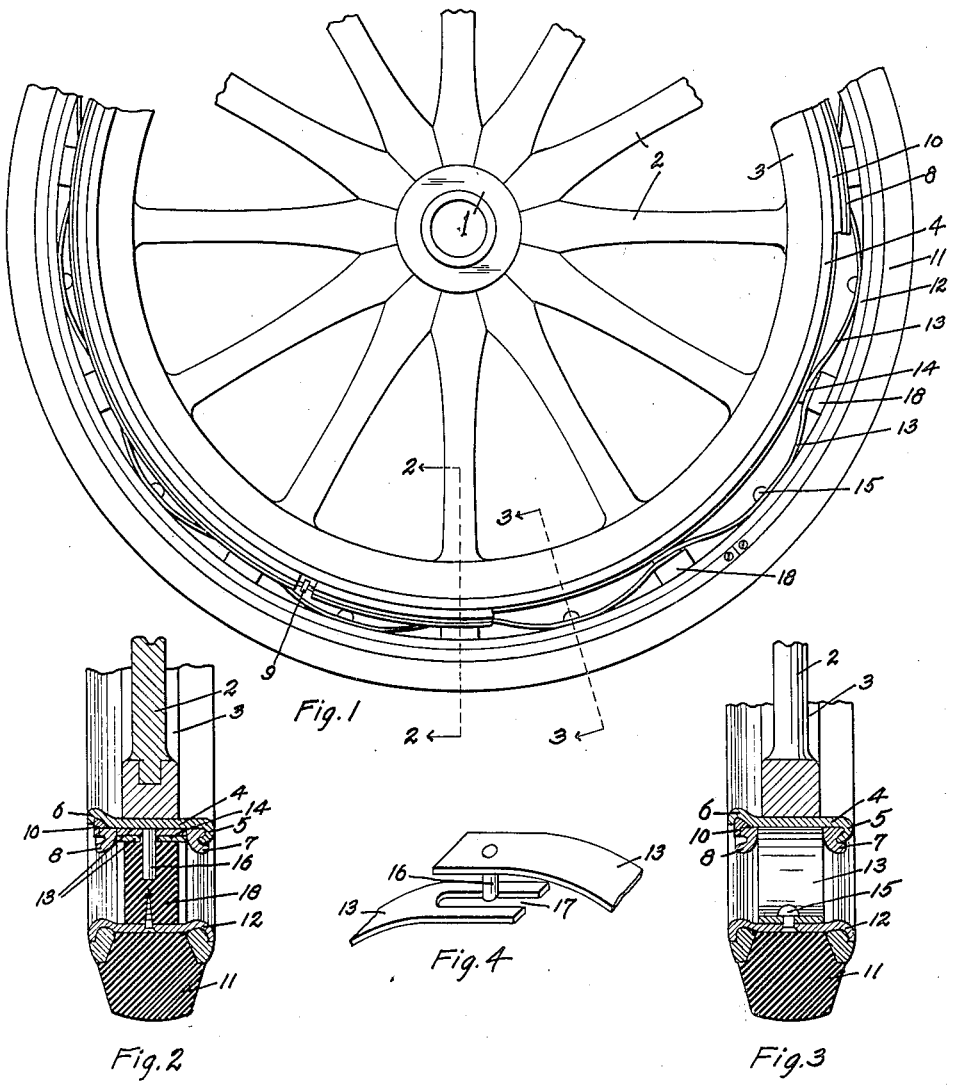

CHARLES H. WEBER, OF HILLIARD, OHIO.

RESILIENT VEHICLE-WHEEL.

1,094,616.  Specification of Letters Patent.  Patented Apr. 28, 1914.

Application filed February 6, 1913. Serial No. 746,426.

*To all whom it may concern:*

Be it known that I, CHARLES H. WEBER, a citizen of the United States, residing at Hilliard, in the county of Franklin and State of Ohio, have invented certain new and useful Improvements in Resilient Vehicle-Wheels, of which the following is a specification.

My invention relates to resilient vehicle wheels of a type designed to replace the present type of pneumatic wheel.

One object of my invention is to provide a wheel of the character described built up from the ordinary wheel body portion now in use. This I accomplish by so constructing the tread element of my wheel that it may be readily mounted upon wheels now in general use. This I accomplish by the provision of a plurality of semi-elliptical springs preferably rigidly carried by the tread element and of a sufficient resiliency to prevent any relative movement between the center portion of the wheel and the tread element when the wheel is used as a driver. By thus eliminating any link connections between the two pieces, too sudden a starting of the vehicle may cause a slight slippage of the tread portion, which will in turn relieve the vehicle body itself of considerable strain.

The preferred embodiment of my invention is shown in the accompanying drawings, in which similar characters of reference designate corresponding parts, and in which:

Figure 1 is a partial side elevation of my preferred type of wheel construction, Fig. 2 is an enlarged section taken on line 2—2 of Fig. 1 looking in the direction of the arrows, and, Fig. 3 is an enlarged section taken on line 3—3 of Fig. 1 looking in the direction of the arrows, and, Fig. 4 is a fragmentary perspective showing my preferred construction of the overlapping spring ends.

In the drawings, I have shown the center piece of my wheel as being of a type similar to the ordinary type of wheel now in use and comprising the hub portion 1, spokes 2 and felly 3. A peripheral band 4 having hooked edges 5 and 6 is shrunk upon the felly to assume the position indicated. The hooked edge 5 is constructed to embrace a ring element 7 which is made removable and which forms one edge of the channel on the rim portion of the felly. The other edge is formed by the removable ring 8 split and held together by means of the double-ended threaded bolt 9 and is adapted to seat itself upon a supplemental removable ring 10 fitting into the downwardly extending hook-shaped edge 6. It will be noted that this hook 6 is of a construction having a slightly less external diameter than the external diameter of that portion of the band 4 directly adjacent the felly. The adaptation of these peculiar types of removable rings are for a purpose to be hereinafter described.

The tread portion is shown as comprising the ordinary rubber portion 11 and mounted in any desirable manner upon a metal rim 12. It is aimed that this metal rim 12 shall carry a plurality of semi-elliptical springs 13, each spring being constructed so that its free ends will be overlapping as indicated at 14 in Fig 1. These springs are secured to the rim 12 by the countersunk head rivets 15 and one end of each of the springs 13 is provided with an outwardly projecting lug 16, while its opposite end is provided with a complemental slot 17.

When the parts are in assembled condition as shown in Fig. 1, the pins 16 are adapted to co-act with the slots 17 to prevent movement of the springs 13 out of their normal position. If it is desired to mount the tread portion upon the vehicle wheel proper, the rings 8 and 10 are removed by loosening of the double-ended bolt 9 and inasmuch as the hooked edge 6 is inward of the level of the major portion of the band 4, the application of the tread portion thereto is a comparatively simple matter. It is aimed that the springs 13 be of such a width as to conveniently occupy the channel formed between the rings 7 and 8 after the latter has been again placed in its true position. It will be obvious, therefore, that lateral shifting of the tread portion will be practically precluded. However, to insure against any accidental dislodgment of the springs 13 and also to prevent bothersome rattle while the wheel is in use, I provide a plurality of resilient buffers 18 adapted to be placed between the rim 12 of the tread portion and the overlapping ends of the springs 13. In order that these buffer elements be not accidentally dislodged, I have made the projecting pins 16 on the spring ends of a sufficient length to partially extend upward within the buffers 18 and have also drilled and countersunk the rim 12 and provided the same with countersunk head screws adapted to grip the buffers 18. In this manner the tread portion is not only prevented from accidental dislodgment, but the bothersome rattle is also positively precluded.

It will be understood that the springs 13 are made sufficiently strong, especially when coöperating with the comparatively unfinished surfaces of the band 4, to prevent the center portion from rotating within the tread portion. When the wheel strikes an obstruction, the springs 13 upon the lower portion of the wheel will be slightly spread apart, which action is permitted by the provision of the pin and slot construction 16 and 17 and it will, therefore, be apparent that a comparatively simple cushioning action is obtained.

What I claim, is:

A resilient vehicle wheel comprising a rigid center piece formed of the hub, spokes and felly, said felly being channel shaped, a removable ring element forming one of the sides of said channel, a tread element, overlapping semi-elliptic springs rigidly carried by said tread element and bearing on said felly, a lug on one end of each overlapping spring end coöperating with a slot in the other end, and resilient buffer elements secured to the tread and formed to fit over said lugs.

In testimony whereof I affix my signature in presence of two witnesses.

CHARLES H. WEBER.

Witnesses:
 WALTER E. L. BOCK.
 C. C. SHEPHERD.